United States Patent [19]

Takahashi

[11] Patent Number: 5,052,903
[45] Date of Patent: Oct. 1, 1991

[54] COMPRESSOR HOUSING HAVING A STRUCTURE FOR PREVENTING SLIPPAGE OF VIBROISOLATING MEMBERS

[75] Inventor: Hareo Takahashi, Iakasaki, Japan

[73] Assignee: Sanden Corporation, Japan

[21] Appl. No.: 489,540

[22] Filed: Mar. 7, 1990

Related U.S. Application Data

[63] Continuation-in-part of Ser. No. 400,002, Aug. 29, 1989.

[30] Foreign Application Priority Data

Mar. 7, 1989 [JP] Japan .............................. 1-25178[U]

[51] Int. Cl.⁵ .............................................. F04S 35/00
[52] U.S. Cl. ........................................ 417/363; 62/295
[58] Field of Search .................... 417/363; 62/295; 248/635, 634, 630

[56] References Cited

U.S. PATENT DOCUMENTS 3,785,167  1/1974  Sahs ..................................... 417/363

Primary Examiner—Leonard E. Smith
Assistant Examiner—Charles G. Freay
Attorney, Agent, or Firm—Banner, Birch, McKie & Beckett

[57] ABSTRACT

An automotive refrigerant compressor according to the present invention comprises a compressor housing that includes at least one bracket. The bracket has a hole through which a fastening member, such as a bolt for example, penetrates. A vibroisolating member is provided that includes a cylindrical portion and an annular flange portion radially extending from one end of the cylindrical portion. The cylindrical portion is firmly inserted into the hole in the bracket, with the flange portion disposed at an outer surface of the bracket. The flange portion includes a pair of protrusions on opposing sides of the flange portion. The protrusions are inwardly bent at the base thereof so as to fit along a side surface of the bracket when the cylindrical portion of the vibroisolating member is inserted into the hole. In accordance with this construction, the refrigerant compressor can be easily mounted within the engine compartment of a motor vehicle without having to be concerned with the conventional problem of splipping vibroisolating members. Furthermore, when a so-called vibroisolating steel member is used as the vibroisolating member of the present invention, separation of the vibroisolating member's rubber plates from the steel plates can be prevented without having to be concerned with the amount of torque used to tighten the fastening bolt.

6 Claims, 4 Drawing Sheets

COMPRESSOR HOUSING HAVING A STRUCTURE FOR PREVENTING SLIPPAGE OF VIBROISOLATING MEMBERS

This application is a continuation-in-part application of co-pending U.S. patent application Ser. No. 07/400,002 filed Aug. 29, 1989.

BACKGROUND OF THE INVENTION

1. Field of the Invention

The present invention generally relates to a refrigerant compressor, such as for use in an automotive air conditioning system, and more particularly, to a refrigerant compressor housing having an improved bracket structure for easier mounting of the compressor within an automobile engine compartment.

2. Description of the Prior Art

Generally, refrigerant compressors for use in automotive air conditioning systems experience a common problem when they are being mounted within the engine compartment of a motor vehicle such as an automobile. During the process of mounting the compressor to either the engine block or the body of the vehicle, washer-like vibroisolating members, which are used to prevent vibrations from the compressor from propagating into the vehicle and creating offensive noise for the passengers, are sandwiched between the compressor's mounting brackets and the vehicle. Mounting bolts are inserted through holes in the brackets and the vibroisolating members, and then fastened to either the engine or body of the vehicle. For the conventional mounting process, the vibroisolating members slip out of alignment and must be held in position by hand or with the aid of a special support jig until the bolts are fastened to the vehicle. This process is made complicated because of the restricted space within the engine compartment.

For example, a conventional automotive refrigerant compressor includes a housing that has a plurality of brackets which are used to mount the compressor to either the engine or body of the vehicle. Each bracket includes a hole through which a fastening member such as a bolt, for example, penetrates. Hereinafter, only mounting of the compressor to the engine is described, for purposes of illustration.

When the compressor is mounted directly to the engine, a washer-like vibroisolating member is inserted between the head of the bolt and the bracket, and a similar member is inserted between the bracket and the engine. Each bolt is pushed through its respective bracket and vibroisolating members, threaded into the body of the engine and then securely tightened. However, the vibroisolating members must be held in position until the bolt is threaded through the bracket, into the engine and tightened.

On the other hand, when the compressor is to be mounted indirectly to the engine, the compressor is fastened to a mounting member which is in turn mounted to the engine. In this instance, a vibroisolating member is inserted between the head of the bolt and the bracket, and a similar member is inserted between the bracket and the mounting member. Each bolt is pushed through its respective bracket, through an arm portion which is plurally formed at the mounting member to accommodate a plurality of brackets, and then threaded into a nut and tightened. In the indirect mounting process, the vibroisolating members must be held in position by hand or a support jig until the bolt is threaded into the nut and tightened.

As a consequence of having to cope with the problem of slipping vibroisolating members, the conventional process of mounting an automotive refrigerant compressor in the restricted space of an engine compartment has become difficult and time-consuming.

SUMMARY OF THE INVENTION

Accordingly, it is an object of the present invention to provide a refrigerant compressor which can be easily mounted in the engine compartment of a motor vehicle without having to cope with the problem of slipping vibroisolating members.

It is a further object of the present invention to provide a refrigerant compressor which can be easily mounted in the engine compartment of a motor vehicle without having to be concerned with the amount of torque used to fasten the compressor to the motor vehicle.

An automotive refrigerant compressor according to the present invention comprises a compressor housing that includes at least one bracket. The bracket has a hole through which a fastening member, such as a bolt for example, penetrates. A vibroisolating member is provided that includes a cylindrical portion and an annular flange portion radially extending from one end of the cylindrical portion. The cylindrical portion is firmly inserted into the hole in the bracket until the flange portion makes contact with an outer surface of the bracket. A pair of rectangular protrusions, projecting from a circumference of the annular flange portion on opposing sides, grasp the bracket so as to prevent rotation of the vibroisolating member.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENTS

Figure 2:
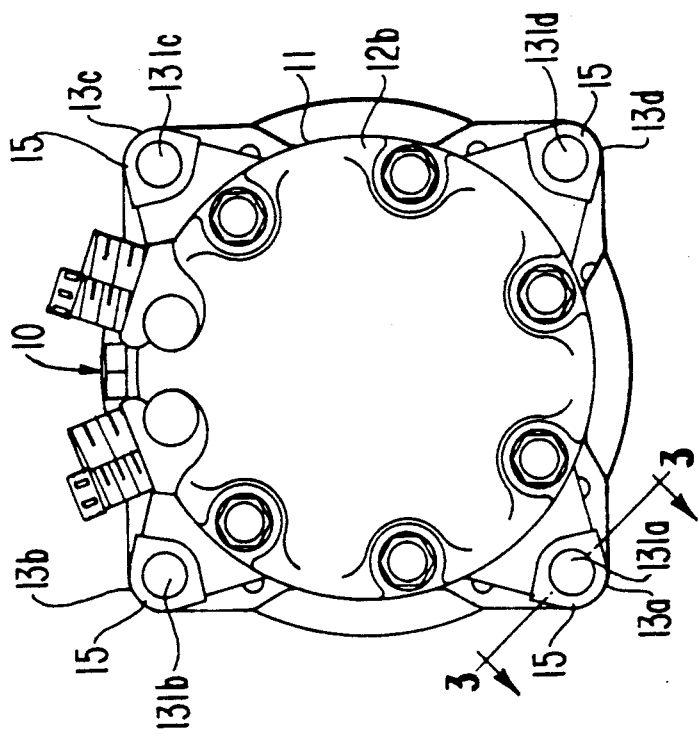
FIG. 2 is a right side view of the compressor shown in FIG. 1.
Figure 1:
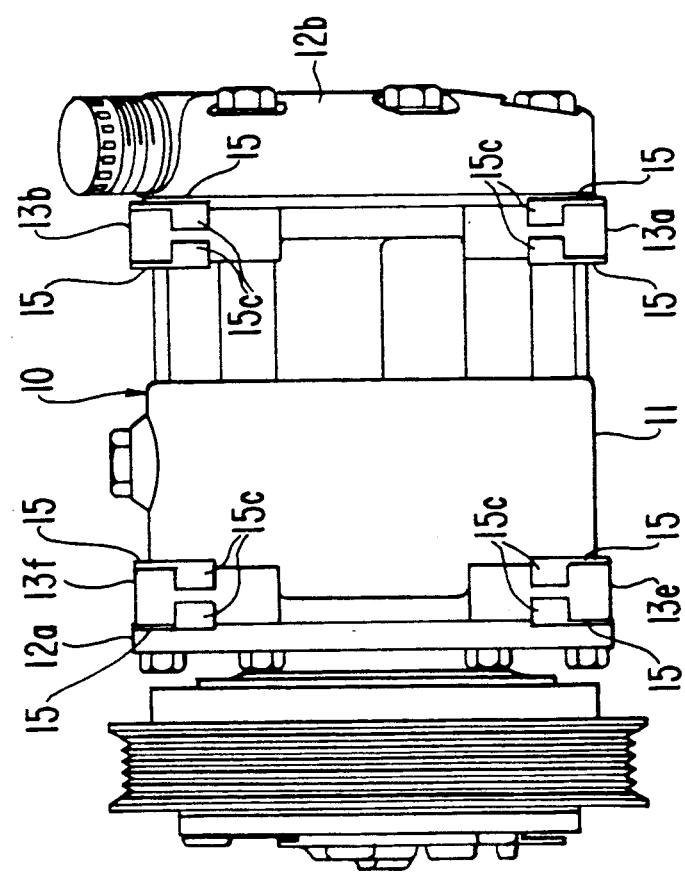
FIG. 1 is a front view of a refrigerant compressor in accordance with a first embodiment of the present invention.

FIGS. 1 and 2 illustrate a refrigerant compressor in accordance with a first embodiment of the present invention. Referring to FIGS. 1 and 2, compressor 10 includes cylindrical housing 11, which contains the compressing and driving mechanisms (not shown), and front and rear end plates 12a and 12b, resepectively, fixedly disposed at the front and rear openings of cylindrical housing 11. Brackets 13a-13d radially project, with a generally equal angular interval, from a near rear end (to the right side in FIG. 1) of an outer peripheral surface of housing 11. Brackets 13e-13h (only brackets 13e and 13f are shown in FIG. 1) radially project, with a generally equal angular interval, from a near front end (to the left side in FIG. 1) of an outer peripheral surface of housing 11. The angular arrangement of brackets 13e-13h corresponds to the angular arrangement of brackets 13a-13d, respectively. The eight brackets 13a-13h are similarly configured and include holes 131a-131h (only holes 131a-131d are shown in FIG. 2), respectively. Hereinafter, only bracket 13a is described, for purposes of illustration.

Figure 3:
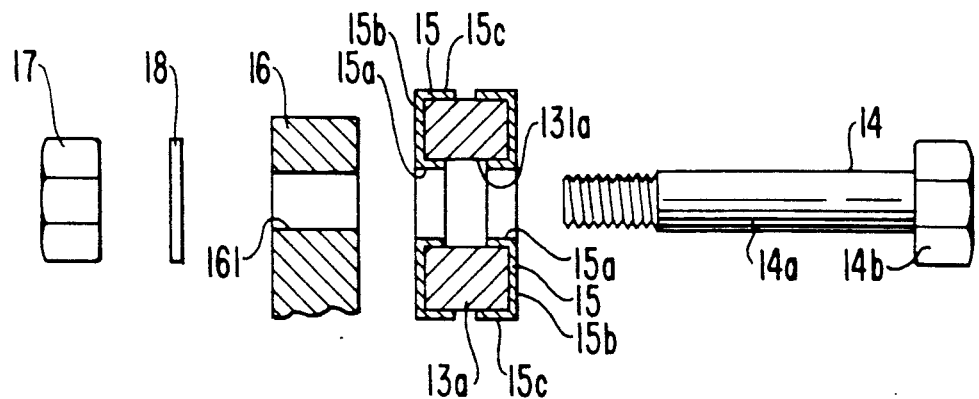
FIG. 3 is a cross-sectional view taken along line 3—3 of FIG. 2. In the drawing, a bolt, a nut, a washer and an arm portion of a mounting member are additionally shown.
Figure 4:
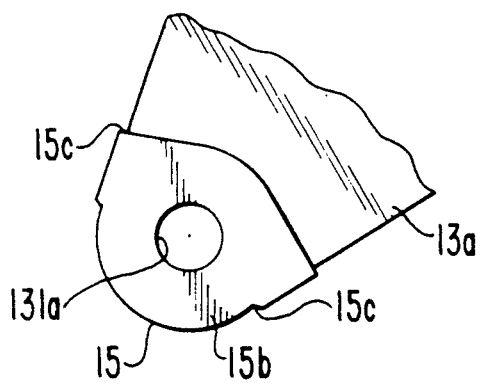
FIG. 4 is an enlarged view of a certain portion of the compressor shown in FIG. 2.
Figure 5:
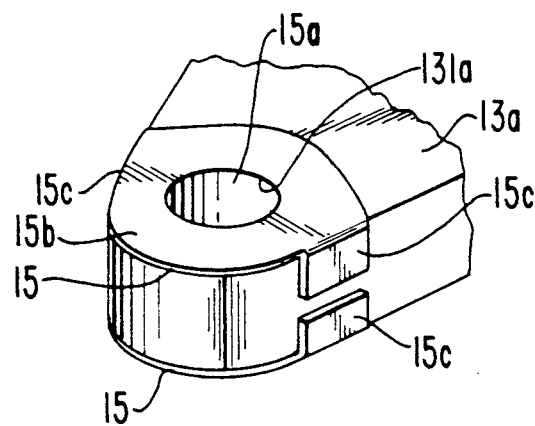
FIG. 5 is a perspective view of the certain portion shown in FIG. 4.

Referring to FIGS. 3, 4 and 5, hole 131a is axially bored through bracket 13a in order to pass shaft portion 14a of bolt 14 therethrough. Bracket 13a is astride U-shaped in a side view, and is provided with a pair of vibroisolating members 15, each of which comprises cylindrical portion 15a and annular flange portion 15b radially extending from one end of cylindrical portion 15a, at respective axial end surfaces thereof. Annular flange portion 15b includes a pair of rectangular protrusions 15c, projecting from a circumference thereof on opposing sides. Rectangular protrusions 15c are inwardly bent at a near circumference of annular flange portion 15b so as to fit along a side surface of bracket 13a when cylindrical portion 15a is inserted into hole 131a.

Figure 6:
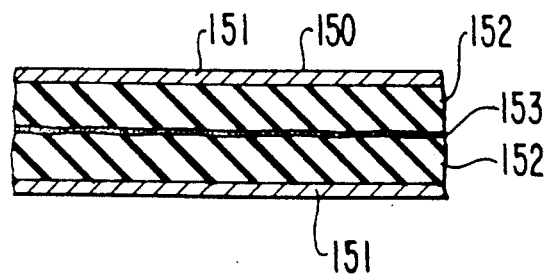
FIG. 6 is an enlarged vertical sectional view of a vibroisolating member used in the preferred embodiments of the present invention.

Vibroisolating members can have various structures. In this embodiment, the structure of vibroisolating member 15 is depicted by so-called vibroisolating steel member 150 of FIG. 6. As shown in FIG. 6, vibroisolating steel member 150 includes a pair of steel plates 151 and a pair of rubber plates 152, each of which is fixedly attached to each of corresponding steel plates 151 by, for example, sulfurizing adhesion. Rubber plates 152 are fixedly attached to each other by use of adhesive 153.

Referring again to FIGS. 3, 4 and 5, cylindrical portion 15a of vibroisolating member 15 is firmly inserted into hole 131a until annular flange portion 15b makes contact with the axial end surface of bracket 13a, in order to prevent vibroisolating member 15 from slipping out of hole 131a. Once vibroisolating member 15 is inserted into hole 131a, rectangular protrusions 15c fit along the side surface of bracket 13a, in order to prevent vibroisolating member 15 from rotating as increased torque is applied to tighten bolt 14. The purpose for preventing vibroisolating member 15 from rotating is to prevent the torsional forces from separating rubber plates 152 from steel plates 151. Consequently, bolt 14 can be tightened without concern for the amount of torque used for tightening.

Referring to FIGS. 1-6, compressor 10 is fastened to an engine (not shown) indirectly by using a mounting member (the main body of which is not shown) which is fastened to the engine as follows.

Arm portions 16 are plurally formed in the mounting member so as to correspond with brackets 13a-13h. Hole 131a of bracket 13a is aligned with hole 161 which is formed in corresponding arm portion 16. Simultaneously, each of holes 131b-131h is aligned with the corresponding hole in each of the seven remaining arm portions of the mounting member. Next, shaft portion 14a of bolt 14 is pushed through holes 131a and 161 until bolt head 14b makes contact with annular flange portion 15b. Finally, bracket 13a of compressor housing 11 is fastened to arm portion 16 of the mounting member by bolt 14 which is screwed through washer 18, into nut 17, and tightened.

In accordance with the above-mentioned construction of the present invention, the compressor can be more easily mounted within the restricted space of the engine compartment of a motor vehicle, without the need to be concerned with slippage of the vibroisolating members. Furthermore, when a so-called vibroisolating steel member is used as the vibroisolating member, the member's rubber plates can be prevented from separating from the steel plates, without the need to be concerned about the amount of torque used for tightening the bolt that fastens the bracket to the mounting member.

Figure 8:
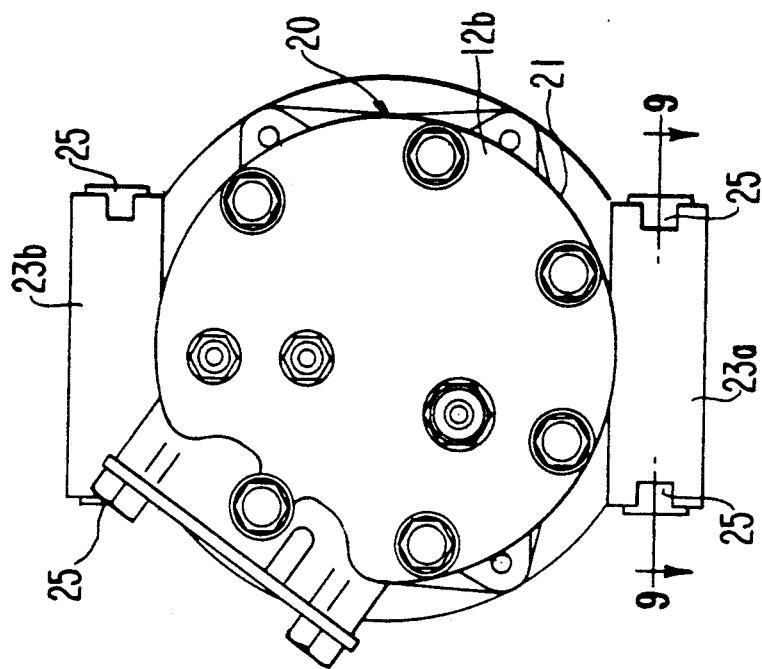
FIG. 8 is a right side view of the compressor shown in FIG. 7.
Figure 7:
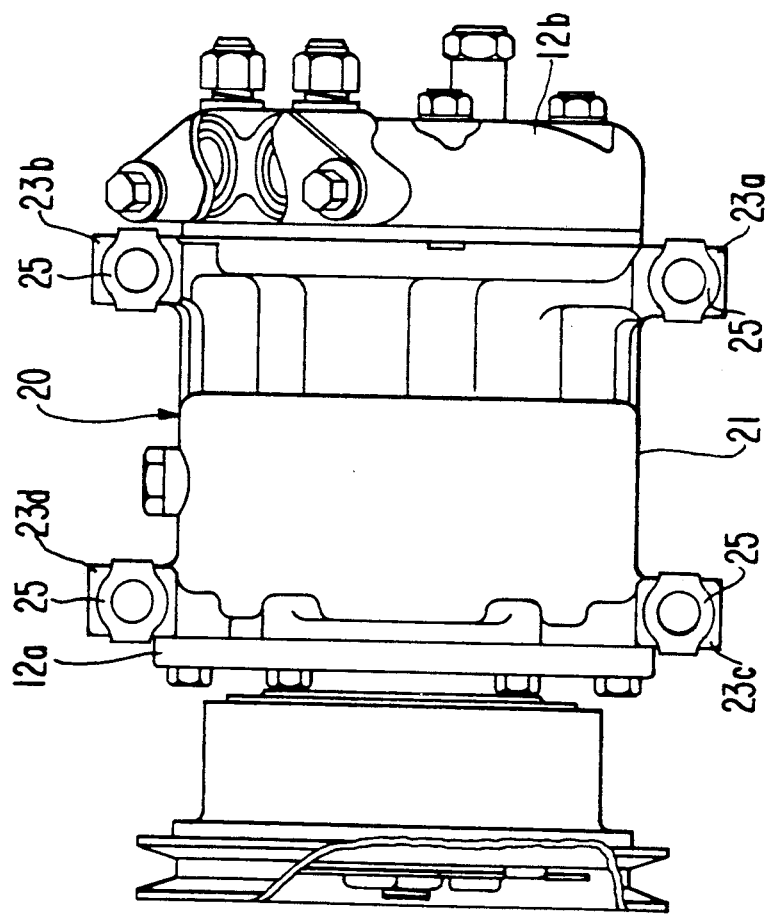
FIG. 7 is a front view of a refrigerant compressor in accordance with a second embodiment of the present invention.

FIGS. 7 and 8 illustrate a refrigerant compressor in accordance with a second embodiment of the present invention. Referring to FIGS. 7 and 8, a pair of latitudinally extended brackets 23a and 23b are formed at the near rear end (at the right side in FIG. 7) of the outer peripheral surface of housing 21 on opposing sides. Another pair of latitudinally extended brackets 23c and 23d are formed at the near front end (to the left side in FIG. 7) of the outer peripheral surface of housing 21 on opposing sides. Latitudinally extended brackets 23a-23d, which are similarly configured and positioned in parallel to each other, are used in a generally similar manner to fasten compressor 20 either to engine 100 or body 200 (FIG. 9) of the motor vehicle. Hereinafter, only bracket 23a is discussed for purposes of illustration.

Figure 9:
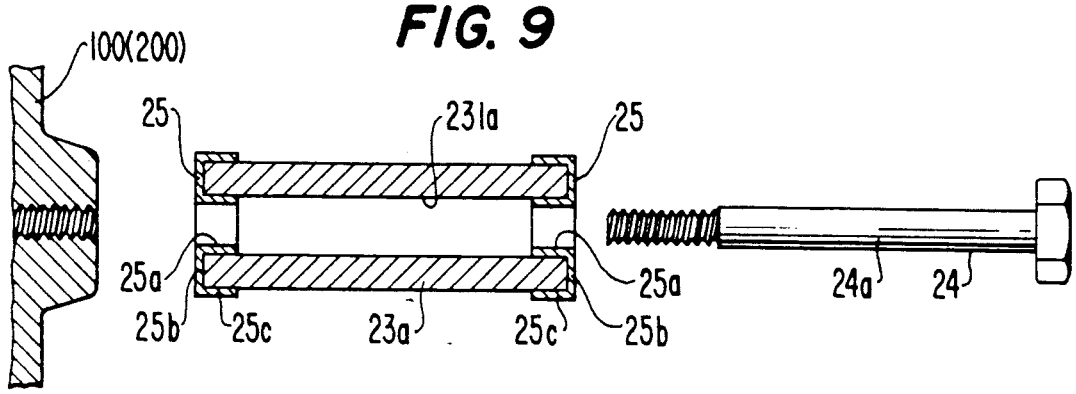
FIG. 9 is a cross-sectional view taken along line 9—9 of FIG. 8. In the drawing, a bolt and a part of either an engine or an automobile body are additionally shown.
Figure 10:
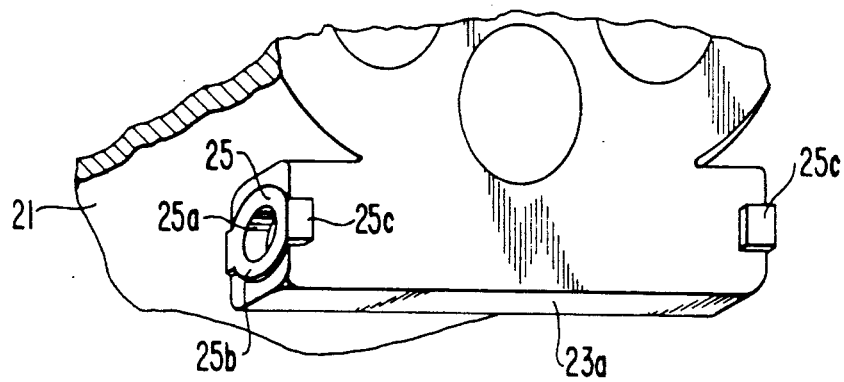
FIG. 10 is a perspective view of a certain portion of the compressor shown in FIG. 7. In the drawing, a rear end plate is omitted.

Referring to FIGS. 9 and 10, hole 231a is axially bored through bracket 23a in order to pass shaft portion 24a of bolt 24 therethrough. Bracket 23a is generally square in a side view, and is provided with vibroisolating member 25, which comprises cylindrical portion 25a and annular flange portion 25b radially extending from one end of cylindrical portion 25a, at respective axial end surfaces thereof. Annular flange portion 25b includes a pair of rectangular protrusions 25c, projecting from a circumference thereof on opposing sides. Rectangular protrusions 25c are inwardly bent at a near circumference of annular flange portion 25b so as to fit along an axial end surface of bracket 23a when cylindrical portion 25a is inserted into hole 231a. In this embodiment, the structure of vibroisolating member 25 is also depicted by so-called vibroisolating steel member 150 of FIG. 6. Cylindrical portion 25a of vibroisolating member 25 is firmly inserted into hole 231a until annular flange portion 25b makes contact with the axial end surface of bracket 23a, in order to prevent vibroisolating member 25 from slipping out of hole 231a. Once vibroisolating member 25 is inserted into hole 231a, rectangular protrusions 25c fit along the axial end surface of bracket 23a, in order to prevent vibroisolating member 25 from rotating as increased torque is applied to tighten bolt 24. The purpose for preventing vibroisolating member 25 from rotating is to prevent the torsional forces from separating rubber plates 152 from steel plates 151. Consequently, bolt 24 can be tightened without concern for the amount of torque used for tightening.

In accordance with the above-mentioned construction, when compressor 20 is fastened directly either to engine 100 or body 200 of the automotive vehicle, each bolt is passed through its respective brackets 23a-23d, screwed into either engine 100 or body 200 of the automotive vehicle and then tightened. Since the effects of this embodiment are similar to the effects of the above-mentioned first embodiment, an additional explanation thereof is omitted.

This invention has been described in detail in connection with the preferred embodiments but is for illustrative purposes only and the invention is not limited thereto. It will be easily understood by those skilled in the art that variations and modifications can easily be made within the scope of this invention as defined by the appended claims.

I claim:

1. A compressor mount for mounting a compressor including a compressor housing in a motor vehicle engine compartment, said compressor mount comprising:
   fastening means for fastening said compressor housing to said motor vehicle engine compartment, said fastening means comprising a screw means;
   at least one bracket attached to said compressor housing, said bracket including a first opening;
   a vibration isolating member comprising a cylindrical portion and a flange portion radially extending from a first end of said cylindrical portion, said cylindrical portion of said vibration isolating member disposed in the first opening of said bracket with the first end thereof disposed adjacent an outer surface of said bracket so as to define a second opening through which said fastening means may be received therethrough; and
   said flange portion of said vibration isolating member in contact with said outer surface of said bracket such that compressor vibrations are isolated to said compressor when said fastening means is disposed within said opening so as to fasten said compressor housing to said motor vehicle engine compartment, said flange portion of said vibration isolating member being annularly shaped; and
   said vibration isolating member being arranged such that the position of said vibration isolating member is maintained with respect to said bracket as said compressor housing is fastened to said motor vehicle engine compartment with said screw means.

2. The compressor mount according to claim 1 wherein said vibration isolating member includes grasping means for grasping said bracket.

3. The compressor mount according to claim 2 wherein said grasping means includes at least two protrusions projecting from the circumference of said flange portion of said vibration isolating member, said protrusions being inwardly bent at a near circumference of said flange portion of said vibration isolating member so as to fit along said outer surface of said bracket.

4. The compressor mount according to claim 3 wherein said protrusions are rectangularly shaped.

5. The compressor mount according to claim 1 wherein said bracket is astride U-shaped.

6. The compressor mount according to claim 1 wherein said bracket is square shaped.

* * * * *